March 24, 1959

A. W. WOODWARD 2,878,551

METHOD OF FORMING A RIM

Filed April 23, 1956

INVENTOR.
ALVA W. WOODWARD
BY
*R. L. Miller*
ATTORNEY

2,878,551
METHOD OF FORMING A RIM

Alva W. Woodward, Kent, Ohio, assignor to The Goodyear Tire & Rubber Company, Akron, Ohio, a corporation of Ohio Application April 23, 1956, Serial No. 579,787

2 Claims. (Cl. 29—159.1)

This invention relates to rims and more particularly to a method for forming one-piece drop center rims with integral mounting means.

With the advent of tubeless tires in truck and bus lines, the one-piece drop center type of rim is used extensively because of its light weight and relative ease in obtaining an airtight seal between the tire and rim. The drop center rim is now accepted practice for vehicle wheels in sizes that include rims in large volume use. It also is essential that a drop center rim which is to replace a multiple piece rim be interchangeable therewith in mounting on the vehicle wheels in order to be most acceptable to the users. The economics of vehicle operation will not permit replacement of both wheels and rims in order to convert to tubeless tires.

Because of the requirement of interchangeable mountings of drop center and multiple piece rims, the practices to date have been to fasten an extra mounting piece or pieces to the drop center rims. This is not only a costly procedure but such mountings are more likely to fail or weaken prematurely. There are more possible sources of rim failure. It is highly desirable to provide a one-piece drop center rim that includes an integral mounting surface. It is therefore an object of this invention to provide a method of forming a drop center rim which includes an integral rim mounting surface.

Another object of the invention is to provide an economical and simple method of forming such a rim.

A further object of the invention is to provide a method of forming such a rim that accurately controls the critical dimensions of the rim.

Other objects and advantages of the invention will appear hereinafter as the description proceeds, the novel features, arrangements and combinations being clearly pointed out in the specification and appended claims.

Figure 1:
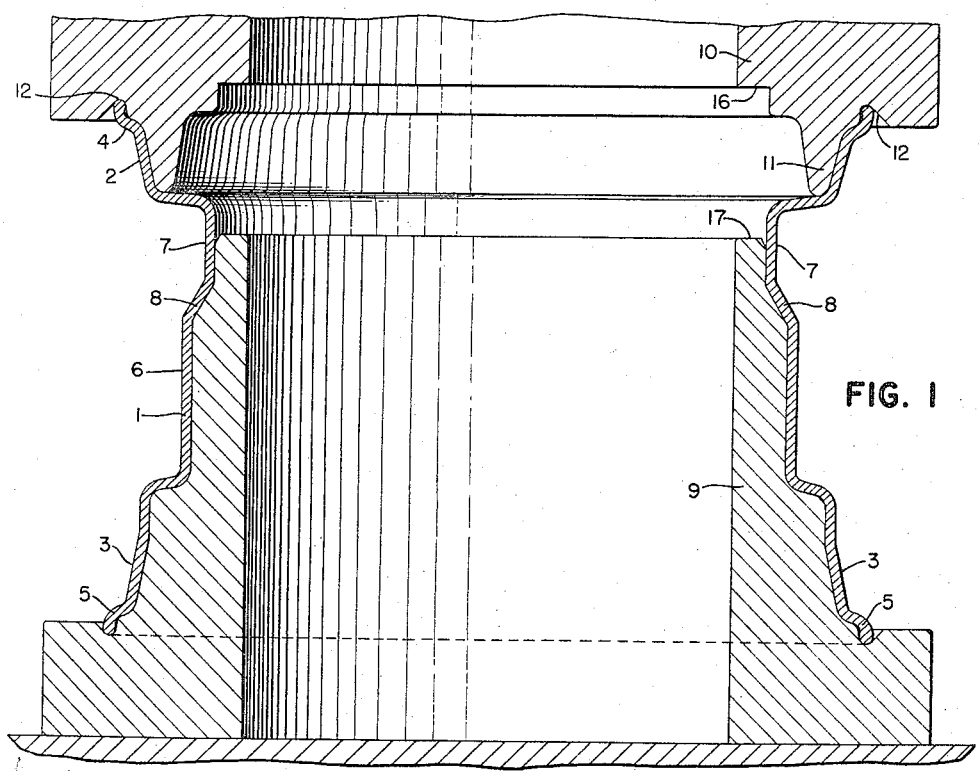
Fig. 1 is a sectional view prior to the forming operation.

In the drawings, a rim base 1 is formed from sheet material in accordance with the usual well known practices. The flat sheet is circled and welded to the proper diameter, then formed by rolling to the contour shown in Fig. 1. The rim base 1 as shown in Fig. 1 has bead seat portions 2 and 3 and bead retaining flanges 4 and 5 formed along the opposite edges of the base 1. The shape and size of the bead seat portions 2 and 3 and the retaining flanges 4 and 5 are in accordance with the accepted standards of the rim industry. The drop center portion 6 between the bead seats 2 and 3 includes a recessed portion 7 joined to the drop center portion by the angularly inwardly extending portion 8. The recessed portion is formed along the edge of the rim that is to be the mounting edge.

After the forming operation on the rim base 1, the base then is accurately sized, particular attention being made with respect to the bead seats 2 and 3 and retaining flanges 4 and 5. Sizing of either finished rims or partially formed sections is well known in the art. The sizing generally is accomplished by either expanding to slightly oversize then shrinking to the desired size or shrinking initially then expanding to the final size. These techniques have been practiced for many years by rim manufacturers and form no part of this invention.

Figure 2:
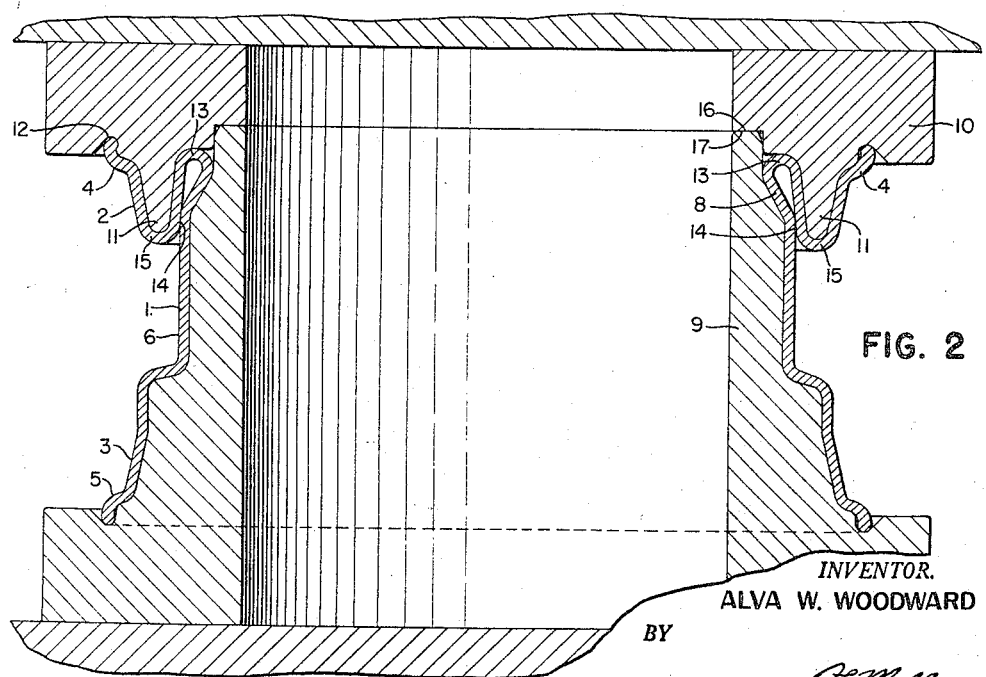
Fig. 2 is a sectional view at the completion of the forming operation.

To form the rim base as shown in Fig. 1 to the final contour as shown in Fig. 2, the formed rim base 1 is placed on the female die section 9 which snugly supports a substantial portion of the inner periphery of the formed base 1. Unsupported by the die section 9 is the axially outer portion of the recessed portion 7 and the bead seat and retaining flange portion 2. The die section 9 may be conveniently attached to the lower platen of a platen press or similar type of apparatus so that the formed base portion may be easily inserted when the press is open.

As shown, attached to the upper platen of the press is a male die section 10. This die includes a downwardly extending portion 11 which engages the inner periphery of the bead seat portion 2 and also includes a notch 12 to receive the edge of the retaining flange 4. As the portion 11 of the die 10 engages the inner periphery of the bead seat, it retains the dimensions of the bead seat at the predetermined size during the remainder of the forming operation.

The die sections 9 and 10 as shown are one-piece sections but either or both may be sectional dies if desired. The particular die construction will be determined by the specific features of the various rims that are to be formed.

As the press is closed, the die 10 folds back or upsets the recessed portion 7 of the rim base 1 on itself to form a loop mounting surface 13 along the edge of the rim. As this is done, the bending in the recessed portion 7 starts at the inner or axial outer end of the angular portion 8. The surface 13 corresponds to the gutter edge mounting surface of the conventional multiple piece rims. It will be noted that the folded back portion rests on the outer periphery of the drop center section 6 as at 14 to form a rigid support for the rim mounting surface 13 and also for the bead seat 2 by means of the arcuate portion 15. In order to accurately form the rim mounting surface 13 of the rim by the die, surface 16 of the die section 10 engages shoulder 17 of the die section 9 to provide a positive stop which limits the closing of the die portions 9 and 10. After the rim is formed, the upper die 10 is withdrawn by opening the press and the completely formed rim is removed from the die.

It is apparent that the herein described method of forming a one-piece drop center rim with an integral rim mounting surface is a simple one step forming operation and includes means to accurately control the critical dimensions of the finished rim. The critical dimensions are the diameters and contours of the retaining flanges and bead seats and the rim mounting surface of the rim. The angular portion 8 and the arcuate portion of the loop 13 form the rim mounting surface which is comparable to that of a conventional multiple piece rim. Since the die positively engages each of these critical surfaces, these portions are not distorted in the forming operation.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. The method of forming a one-piece drop center rim having an integral mounting surface along one edge thereof comprising the steps of forming an endless integral annular base having bead seat portions and bead retaining flanges along opposite edges thereof with a drop center section therebetween, said drop center section having a radially inwardly recessed portion along the mounting edge of the rim and joined to the drop center portion by a portion extending angularly inwardly therefrom toward the rim mounting edge; sizing said integral base to a predetermined shape and size; supporting the radial inner surface of the formed base in one section of a two section forming die with the laterally outer portion of the recessed portion and the adjacent bead seat and the retaining flange being unsupported; moving the second portion of said forming die axially toward said first section to engage the radial inner surface of the unsupported bead seat and flange to maintain the bead seat and flange at the predetermined size; continuing the axial movement of said second section to bend, at the axial outer end of the angular joining portion, the recessed portion of said drop center back over itself to a U form and further continuing said axial movement of said second section to roll said recessed portion back on itself whereby the lateral inner portion of the bent back portion positively contacts the radial outer surface of the drop center section to form a rigid rim mounting surface with the bead seat and retaining flange lying radially outwardly of said rim mounting portion and supported in spaced relation therefrom by a portion of the reshaped recessed portion.

2. The method of forming a one-piece drop center rim having an integral mounting surface along one edge thereof comprising the steps of forming an endless annular base having bead seats and bead retaining flanges along opposite edges thereof with a drop center section therebetween, said drop center section having a radially inwardly recessed portion along the mounting edge of the rim and joined to the drop center portion by a portion extending angularly inwardly therefrom toward the rim mounting edge; accurately sizing said bead seats and retaining flanges of said base; supporting on one section of a forming die the portion of the base including one of said bead seats and retaining flanges, the drop center section and a portion of the radially inwardly recessed portion; moving a second section of the forming die axially towards said first die section, said second section first engaging the radial inner surface of the unsupported bead seat and flange to maintain the bead seat and flange at the predetermined size; continuing the axial movement of said second section to bend, at the axial outer end of the angular joining portion, the recessed portion of said drop center section back over itself to a U form and further continuing said axial movement of said second section to roll said recessed portion back on itself, whereby the lateral inner portion of the bent back portion positively contacts the radial outer surface of the drop center section to form a rigid rim mounting surface with the bead seat and retaining flange lying radially outwardly of said rim mounting surface and supported in spaced relation therefrom by a portion of the reshaped recessed portion.

References Cited in the file of this patent
UNITED STATES PATENTS

| | | |
|---|---|---|
| 1,760,560 | Kranz et al. | May 27, 1930 |
| 2,159,900 | Le Jeune et al. | May 23, 1939 |
| 2,181,020 | Le Jeune | Nov. 21, 1939 |
| 2,268,838 | Lyon | Jan. 6, 1942 |
| 2,291,394 | Le Jeune | July 28, 1942 |